(12) United States Patent
Delamarche et al.

(10) Patent No.: US 11,150,215 B2
(45) Date of Patent: Oct. 19, 2021

(54) MICROFLUIDIC DEVICE WITH LATERALLY INSERTABLE ELECTRODES

(71) Applicant: INTERNATIONAL BUSINESS MACHINES CORPORATION, Armonk, NY (US)

(72) Inventors: Emmanuel Delamarche, Thalwil (CH); Yuksel Temiz, Zug (CH); Sufi Zafar, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 15/718,165

(22) Filed: Sep. 28, 2017

(65) Prior Publication Data
US 2019/0094178 A1 Mar. 28, 2019

(51) Int. Cl.
*G01N 27/26* (2006.01)
*G01N 27/447* (2006.01)
(Continued)

(52) U.S. Cl.
CPC .... *G01N 27/44791* (2013.01); *B01L 3/50273* (2013.01); *B01L 3/502715* (2013.01);
(Continued)

(58) Field of Classification Search
CPC ............. G01N 27/44791; G01N 27/07; B01L 3/502715; B01L 3/50273; B01L 9/527;
(Continued)

(56) References Cited

U.S. PATENT DOCUMENTS 6,461,190 B1* 10/2002 Boulay ................ H01R 13/60
439/501
6,595,232 B2* 7/2003 Guzman ............ B81C 1/00071
137/15.01
(Continued)

FOREIGN PATENT DOCUMENTS

CN 104549591 A 4/2015
CN 111148991 A 5/2020
(Continued)

OTHER PUBLICATIONS

Guérin et al., "Lab-on-Skin with Zero-Power Interface," TETRACOM Projects, 2016, 1 Page, Technology Transfer in Computing Systems, xsensio.
(Continued)

*Primary Examiner* — Thanh Truc Trinh
(74) *Attorney, Agent, or Firm* — Samuel A. Waldbaum

(57) ABSTRACT

The invention is notably directed to a microfluidic device. The device comprises a substrate with a microchannel formed as a groove on a main surface of the substrate. The device further comprises one or more conduits extending parallel to the main surface of the substrate, and from a lateral surface of the substrate up to a lateral wall of the microchannel. The one or more conduits are configured so as to allow insertion of one or more electrodes therein, respectively, and such that an end of each of the one or more electrodes can reach into the microchannel. The invention is further directed to related sets of components, which include the above microfluidic device, as well as a housing, with electronics, and, possibly, a porous support (e.g., a membrane) and a cap. Biosensing applications are notably contemplated. The invention is further directed to methods of operating a microfluidic device.

18 Claims, 6 Drawing Sheets

(51) Int. Cl.
  *B01L 3/00* (2006.01)
  *B01L 9/00* (2006.01)
  *G01N 27/07* (2006.01)

(52) U.S. Cl.
  CPC ......... *B01L 9/527* (2013.01); *B01L 2200/025* (2013.01); *B01L 2300/042* (2013.01); *B01L 2300/0609* (2013.01); *B01L 2300/069* (2013.01); *B01L 2300/0645* (2013.01); *B01L 2300/0816* (2013.01); *B01L 2300/0848* (2013.01); *B01L 2300/165* (2013.01); *B01L 2400/0406* (2013.01); *G01N 27/07* (2013.01)

(58) Field of Classification Search
  CPC ......... B01L 2200/025; B01L 2300/042; B01L 2300/0609; B01L 2300/0645; B01L 2300/069; B01L 2300/0816; B01L 2300/0848; B01L 2300/165; B01L 2400/0406
  See application file for complete search history.

(56) References Cited

U.S. PATENT DOCUMENTS

| | | | | |
|---|---|---|---|---|
| 7,364,647 | B2* | 4/2008 | Paul | B01D 61/18 156/223 |
| 2002/0144895 | A1* | 10/2002 | Stern | B01L 3/50273 204/242 |
| 2004/0067166 | A1* | 4/2004 | Karinka | B01L 3/502723 422/82.03 |
| 2008/0213133 | A1* | 9/2008 | Wallace | B01L 3/5023 422/82.05 |
| 2009/0147253 | A1* | 6/2009 | Hartmann | B01L 3/502715 356/246 |
| 2009/0236226 | A1 | 9/2009 | Ki | |
| 2010/0055673 | A1 | 3/2010 | Agarwal et al. | |
| 2015/0001083 | A1 | 1/2015 | Martin et al. | |
| 2016/0336144 | A1* | 11/2016 | Gardiner | H01J 37/26 |
| 2017/0370866 | A1* | 12/2017 | deSa | G01N 33/5438 |

FOREIGN PATENT DOCUMENTS

| | | |
|---|---|---|
| DE | 112018005552 T5 | 6/2020 |
| GB | 2581291 A | 6/2020 |
| JP | 2020535413 A | 12/2020 |
| KR | 10-2009-0043632 A | 5/2009 |
| WO | 2005007866 A2 | 6/2007 |
| WO | 2014177670 A1 | 11/2014 |
| WO | 2019064110 A1 | 4/2019 |

OTHER PUBLICATIONS

Worse et al., "Wearable Paper-Based Microfluidic Biomarker Sensor Patch," NBMC Projects, 2016, 19 Pages, ACIM Project FA86501327311-1, University of Massachusetts, GE Global Research.

Nie, "Integrated Evaporation Driven Microfluidic Device for Continuous Sweat Monitoring," Technische Universiteit Eindhoven Thesis, May 4, 2016, p. 1-108, NanoNextNL.

Rose et al., "Adhesive RFID Sensor Patch for Monitoring of Sweat Electrolytes," IEEE Transactions on Biomedical Engineering, Jun. 2015, p. 1457-1465, vol. 62, No. 6.

Zeinali, "Microfluidic Device With 3D Electrode Structure for High Throughput Dielectrophoretic Applications," Bilkent University Thesis, Oct. 2014, p. 1-62.

International Search Report and Written Opinion of International Application No. PCT/IB2018/056990 (CH920170029PCT01) dated Jan. 21, 2019.

* cited by examiner

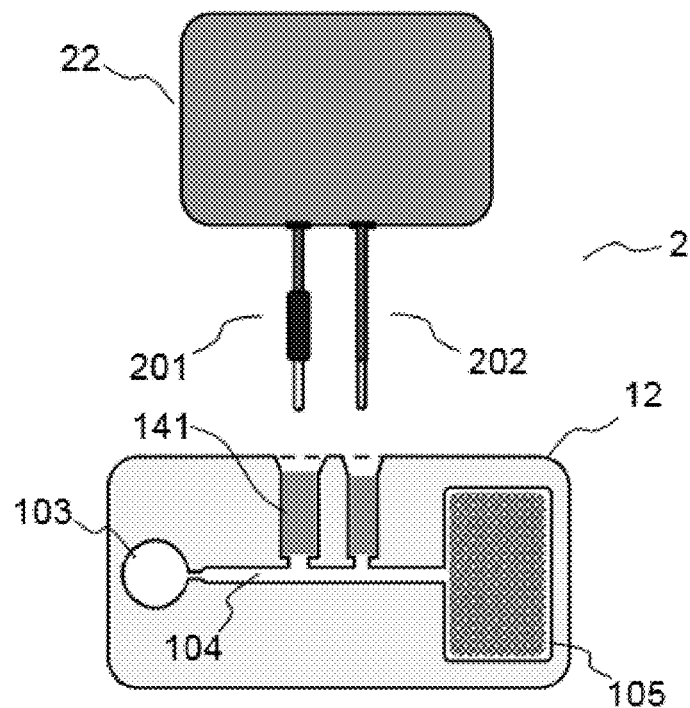
FIG. 2C
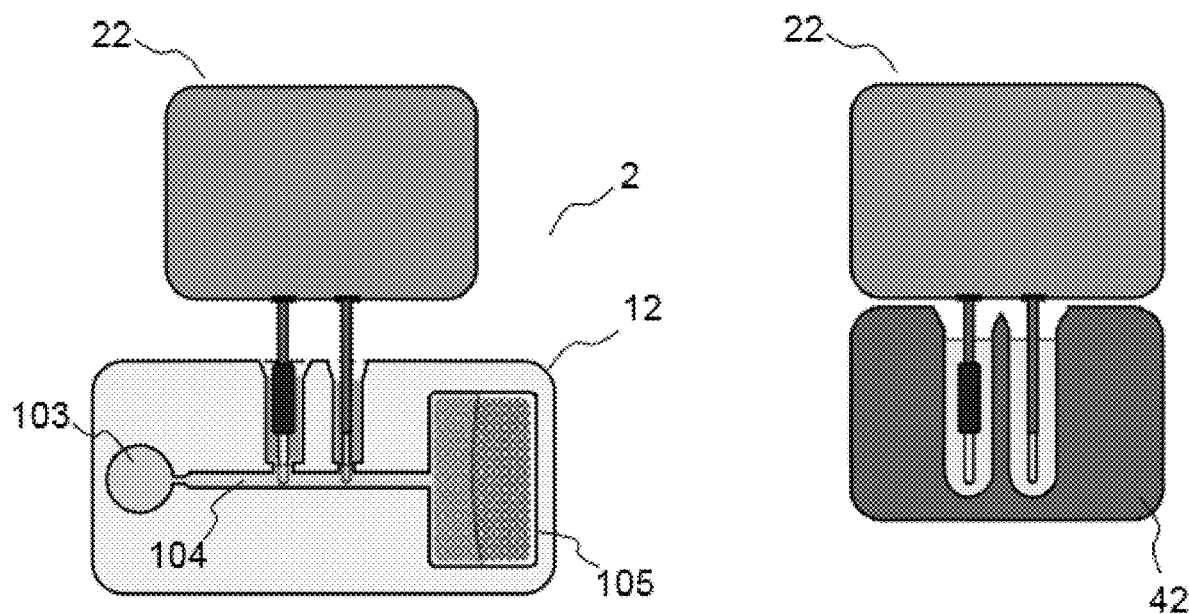
FIG. 2D
FIG. 2E

MICROFLUIDIC DEVICE WITH LATERALLY INSERTABLE ELECTRODES

BACKGROUND

The present invention relates in general to the field of microfluidic devices, and microfluidic devices configured to allow insertion of standard or customized electrodes in particular.

Biosensors rely on living organisms or biological molecules, such as enzymes or antibodies, to detect the presence of chemicals. They can notably be used to obtain data about the physiological state of a person and, as such, allow a vast range of health and medical applications.

Many devices used for (bio)sensing require electrodes. Biosensors are sometimes built on a microfluidic chip. Microfluidics deals with the precise control and manipulation of small volumes of fluids that are typically constrained to micrometer-length scale channels and to volumes typically in the sub-milliliter range. Prominent features of microfluidics originate from the peculiar behavior that liquids exhibit at the micrometer length scale. Flow of liquids in microfluidics is typically laminar. Volumes well below one nanoliter can be reached by fabricating structures with lateral dimensions in the micrometer range. Microfluidic devices generally refer to microfabricated devices, which may be used for pumping, sampling, mixing, analyzing and dosing liquids.

Many microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation. The analysis of liquid samples often requires a series of steps (e.g., filtration, dissolution of reagents, heating, washing, reading of signal, etc.). Metallic electrodes are sometimes patterned in channels of the device.

SUMMARY

According to a first embodiment, the present invention is embodied as a microfluidic device. The device comprises a substrate with a microchannel formed as a groove on a main surface of the substrate. The device further comprises one or more conduits extending parallel to the main surface of the substrate. The conduits further extend from a lateral surface of the substrate up to a lateral wall of the microchannel. The one or more conduits are otherwise configured so as to allow insertion of one or more electrodes therein, respectively, such that an end of each of the one or more electrodes can reach into the microchannel.

The proposed configuration allows external electrodes to be easily plugged in (and possibly easily removed from) the microfluidic device. Electrodes are inserted laterally (i.e., in-plane with the substrate). This way, fragile electrodes are less likely to break upon insertion. In addition, the electrodes are less dangerous, especially if the device is embodied as a wearable sensor, such as a patch worn on, or close to, the skin. Thus, laterally inserted electrodes will extend parallel to the substrate and hence parallel to the skin in practice, which makes the electrodes less dangerous for the user who wears the device. The present devices are preferably designed such that the electrodes may be easily be replaced (e.g., in case they break or are not functional anymore).

In embodiments, the microchannel extends, at one end, from a sample collection aperture formed on a main surface of the substrate. This aperture is configured so as to collect a sample transversely to the main surface and then allow the collected sample to pass into the microchannel, in operation. A sample is thus collected transversely to the substrate (e.g., the sample to be collected is transversely aspirated or otherwise passed along an out-of-plane direction), before being transported via the channel (i.e., in-plane with the substrate). This way, the device can be embodied as a flat (e.g., planar) device, which can easily be placed and worn by a user. This feature makes it particularly suited for biosensing applications.

According to at least one embodiment, the microchannel extends, at another end, from an area on a main surface of the substrate, which area includes a medium configured so as to capillary pull a sample from the microchannel. This medium may include a liquid absorbent material and/or capillary structures, so as for the area and the medium to form a capillary pump. Although other means can be contemplated to collect the sample, a capillary traction makes it typically simpler and cost-effective as no active pumping means are needed. In addition, this makes it possible to preserve a form factor for the (flat) device.

According to at least one embodiment, the one or more conduits extend from one or more orifices, respectively. The orifices are formed on the lateral surface of the substrate. Furthermore, the orifices are flared, so as to ease insertion of the electrodes, in operation.

The present devices may be provided with electrodes inserted therein, or not. In other words, in some embodiments, the device includes said electrodes. The electrodes may be inserted in respective conduits of the substrate, such that an end of each of the one or more electrodes reaches into the microchannel.

According to at least one embodiment, at least one of said one or more electrodes has an average diameter that is between 0.4 mm and 2.0 mm. Such dimensions may be particularly advantageous in view of fabrication constraints on the microfluidic devices, as discussed in detail in the next section.

In preferred embodiments, the electrodes are removably inserted in the conduits. That is, on the one hand, said one or more electrodes and, on the other hand, said one or more conduits and/or said one or more orifices are configured so as for said one or more electrodes to be removably inserted in said one or more conduits.

In variants, or in addition to being removably inserted, one or more of the electrodes may be slidably inserted in the conduits. More precisely, one or more of the conduits and/or one or more of the orifices may be configured so as for said one or more electrodes to be slidably inserted in said one or more conduits.

In embodiments, the conduits comprise a hydrophobic inner coating and/or a liquid pinning structure, so as to prevent liquid in the microchannel to escape the latter via the conduits. The electrodes too may be coated with a hydrophobic coating, if necessary.

According to at least one embodiment, the device comprises two conduits and two electrodes, the latter respectively inserted in the two conduits, such that an end of each of the two electrodes reaches into the microchannel. The two electrodes typically include a reference electrode and a working electrode.

In preferred embodiments, the two conduits are configured such that a distance (a gap) between ends (the sensing portions) of the two electrodes that reach into the microchannel is less than 2 mm, so as to reduce the resistance arising due the solution probed in the microchannel.

In embodiments, the device comprises one or more microchannels, each formed as a groove on a main surface of the substrate. In addition, the device comprises at least three conduits extending parallel to said main surface, from a lateral surface of the substrate up to a lateral wall of one of the one or more microchannels. The at least three conduits are configured so as to allow insertion of at least three electrodes therein, respectively, and such that an end of each of the at least three electrodes can reach into one of the one or more microchannels. The electrodes now include a reference electrode and at least two working electrodes. Such embodiments can advantageously be applied to multiplexing applications.

According to at least one embodiment, the device further comprises an indent, arranged opposite to one of the one or more conduits, with respect to the microchannel, so as to allow insertion of an electrode into said one of the one or more conduits. This way, an end of this electrode can reach into the indent through the microchannel. When not in use, the electrode may for instance be pushed so as for the electrode tip to reach a bottom face of this indent, e.g., in order to protect the electrode and/or seal a diaphragm (a glass frit) of the electrode and prevent evaporation of an electrolyte in the electrode pin.

According to another embodiment, the invention may be embodied as a set of components (i.e., an assembly). Such components include a microfluidic device according to embodiments. They further include the electrodes and an electronic device (peripheral device). The latter comprises a housing and electronics, which are encapsulated in the housing, in such a manner that the electronics can be set in electric communication with the one or more electrodes. The electronics are otherwise configured to read signals obtained from the one or more electrodes, in operation.

According to at least one embodiment, the housing is watertight, which has multiple advantages. For example, liquid sample (e.g., sweat) can accordingly not leak into the electronics. In addition, the device can easily be washed and cleaned after use.

In embodiments, the electrodes are mounted on the housing and are, each, protruding from a lateral surface of the housing, which allows simple designs.

In variants, the electrodes are held parallel to a basis surface of the electronic device. For example, the housing of the electronic device comprises a snap-fit mechanism configured to receive the electrodes. Once received on the snap-fit mechanism, the electrodes extend parallel to a basis surface of the housing. The electrodes can then be inserted in the conduits of the microfluidic device, by suitably pushing the housing, above and parallel to the microfluidic device. In this configuration, the electrodes are less prone to breakage, upon insertion.

In preferred embodiments, the above set further comprises a porous support. The substrate of the microfluidic device fits on this porous support. In operation, the microchannel of the microfluidic device extends, at one end, from a sample collection aperture formed on a main surface of the substrate, with the aperture configured so as to collect a sample from the porous support and allow collected sample to pass into the microchannel.

If necessary, the above set further comprises a storage cap for storing the electronic device (with electrodes mounted thereon). That is, the storage cap comprises cavities designed to receive the electrodes as the electronic device is stored on the storage cap.

According to another embodiment, the present invention is embodied as a method of operating a microfluidic device (according to embodiments). A key step is to insert the electrodes in the conduits of the microfluidic device, such that an end of each of the one or more electrodes reaches into the microchannel, and so as to enable measurements.

In operation of the device, the method typically comprises capillary pulling a liquid (comprising a sample) in the microchannel, and obtaining a signal via the electrodes to analyze the sample.

In preferred embodiments (e.g., in biosensing applications), the microfluidic device is maintained, with the electrodes inserted therein, on a surface (e.g., the skin of a human being) that produces said liquid (e.g., sweat), while capillary pulling the liquid.

According to at least one embodiment, the microfluidic device is maintained on said surface with a porous support sandwiched between said surface and the microfluidic device.

Microfluidic devices, bio sensors, sets of components (including such devices) and methods embodying the present invention will now be described, by way of non-limiting examples, and in reference to the accompanying drawings.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are intended to depict only typical embodiments of the invention, and therefore should not be considered as limiting the scope of the invention. In the drawings:

FIG. 2C shows a bottom view of the microfluidic device and the housing, before assembly according to at least one embodiment;

FIG. 2D shows the same components after assembly according to at least one embodiment;

FIG. 2E is a view of the housing, as stored on a modified storage cap according to at least one embodiment;

DETAILED DESCRIPTION

Figure 1A:
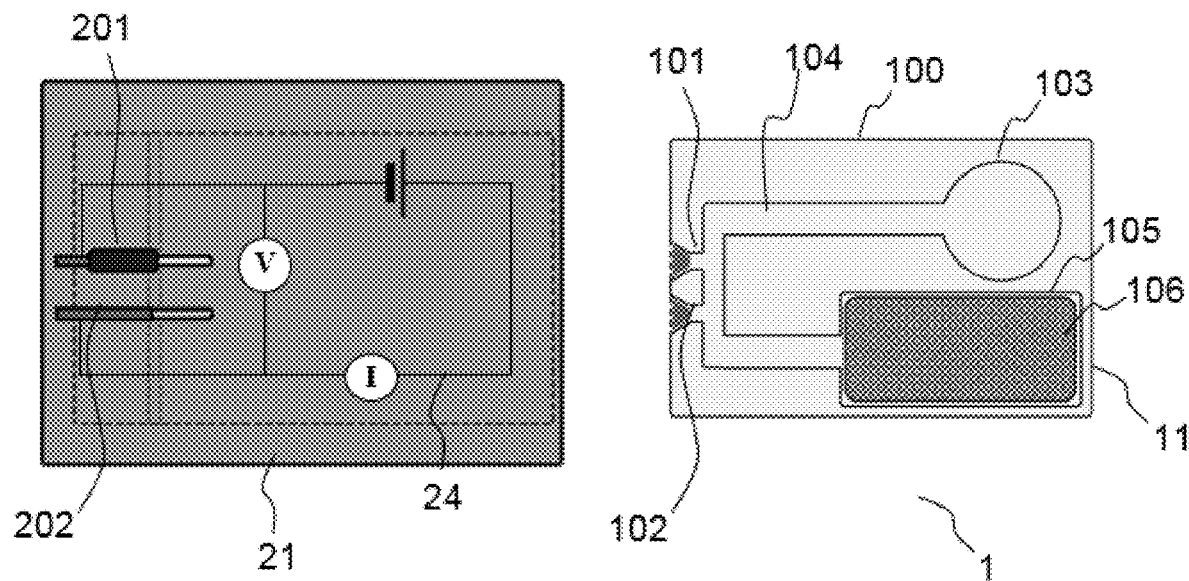
FIG. 1A shows a bottom view of the microfluidic device and the housing before assembly according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Many microfluidic devices and devices used for (bio) sensing require electrodes. Creating such electrodes (e.g., by patterning metals on substrates used to fabricate the microfluidic devices) can be process intensive and costly.

Also, devices used for biosensing applications must typically have a form factor suited for portability purposes. Such devices should further be reasonably safe (they may for example need to incorporate safe materials only). In addition, such devices should not be prone to leakage or breaking.

The electrodes should ideally be easily added to the device, and if possible, easily removed for exchange, without this necessarily requiring a technical expert or an elaborate setup.

Thus, the present invention includes a new concept of microfluidic devices, in which electrodes are laterally inserted in the microfluidic device and typically separable from the sensing device. This approach, however, raises additional challenges. For example, a leak-free assembly may be required. In addition, a high-quality reference electrode may be needed, in some applications. Such a reference electrodes may typically comprise an electrolyte of a well-defined chemical composition (e.g., Ag/AgCl reference electrode) and the lifetime of such an electrode might be an issue if the electrolyte evaporates.

The following description is structured as follows. First, general embodiments and high-level variants of the present invention are described in greater detail below with respect to section 1. Section 2 addresses more specific embodiments and technical implementation details.

1. General Embodiments and High-Level Variants

In reference to FIGS. 1-4, an aspect of the invention is first described, which concerns a microfluidic device 11, 12, 13, 14. Such a device comprise one or more microchannels and other microfluidic features, a characteristic dimension of which (e.g., width or depth) is in the micrometer-length range (i.e., typically between 1 µm and 100 µm). Yet, some particular structures of such devices may be in the nanoscale range or in the millimeter range, the devices as a whole typically being in the centimeter range. Various embodiments of this microfluidic device are contemplated, starting with those illustrated in FIGS. 1-4. In all cases, such devices 11-14 all comprise a substrate 100 with a channel grooved thereon and lateral, in-plane conduits 101, 102, allowing lateral insertion of electrodes therein.

More in detail, such devices 11-14 comprise a substrate 100 having a microchannel 104 (also referred to as a "channel") formed as a groove on a main surface of the substrate 100. The substrate is typically an essentially planar object, such as a chip, a wafer or any such planar support. However, the substrate may, in variants, have other structures formed thereon. In fact, the substrate only need be planar in the vicinity of the channel 104, i.e., near the groove forming this channel. Assuming that the substrate is an essentially planar object, like a parallelepiped, the two opposite main surfaces of the substrate can, each, be regarded as a basis surface of the substrate, as opposed to lateral surfaces thereof, which have smaller surface areas that the basis surfaces.

The microchannel 104 may hence typically be formed as a groove on a basis surface of an essentially planar support 100, so as for the channel to extend in-plane with this substrate 100. This groove can be regarded as having two lateral walls and a lower wall in-between. Still, a channel may also have a rounded section and thus be delimited by a single continuous wall. In all cases, the channel 104 is formed as an elongated depression in a planar portion of the substrate, which depression forms a groove. The latter can be closed by a lid 51, 52, a cover or any capping component (typically have a flat lower surface). Thus, closed channels can eventually be formed at an interface between the substrate 100 and a cover (or lid), with the cover closing the substrate 100 and thus the groove formed thereon.

In addition, one or more conduits 101, 102 are provided in the substrate. The conduits 101, 102 are in-plane vias, i.e., ducts that extend in-plane with the planar substrate 100. That is, the conduits extend parallel to the main surface of the substrate 100. The conduits further extend from a lateral surface of the substrate 100 up to a lateral wall of the microchannel 104 (or a lateral portion of a wall delimiting the channel), as for example seen in FIG. 1A-1C or 2A.

The conduits too may be grooved on the same (main, basis) surface of the substrate 100 as the channel 104. Thus, the grooves meant to form the conduits can be closed by a suitable lid 52 (as assumed in FIG. 2B), a cover or any suitable capping component, which is preferably the same component as used to close the channel 104 (as in FIG. 2B). In variants, conduits are drilled laterally, which is, however, more difficult to process. In all cases, the conduits typically ensure lateral fluid communication between the microchannel 104 and the environment of the substrate 100. Normally, the conduits extend from a given lateral edge surface of the substrate up to a lateral (portion of the) wall of the channel that is the closest to said given lateral edge surface, as in FIGS. 1-4. Yet, the conduits and the channel may be given any suitable shape. For example, the channel 104 may typically have a bent shape (i.e., bent in-plane, as in FIG. 1).

Yet, the conduits are not meant to ensure fluid communication in practice. On the contrary, the conduits 101, 102 are configured to allow insertion of respective electrodes 201, 202 therein, as depicted in FIG. 1A-1B or 2C-2D. Note that the conduits may be designed to only receive an "active' portion of an electrode, i.e., the sensing portion (e.g., a protruding pin, tip or needle of the electrode), as assumed in FIGS. 1A-1B. In variants, the conduits are designed to receive both this active portion and a sheath (a jacket or any support component of this electrode), for example, fitted in a portion of the conduits (e.g., using an interference fit mechanism), as assumed in FIG. 2D.

Figure 1B:
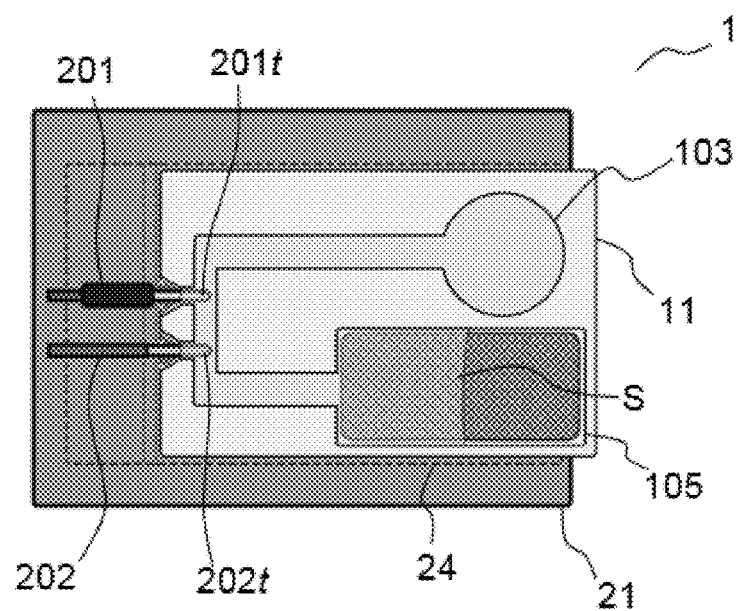
FIG. 1B shows a bottom view of the microfluidic device and the housing after assembly according to at least one embodiment.
Figure 1C:
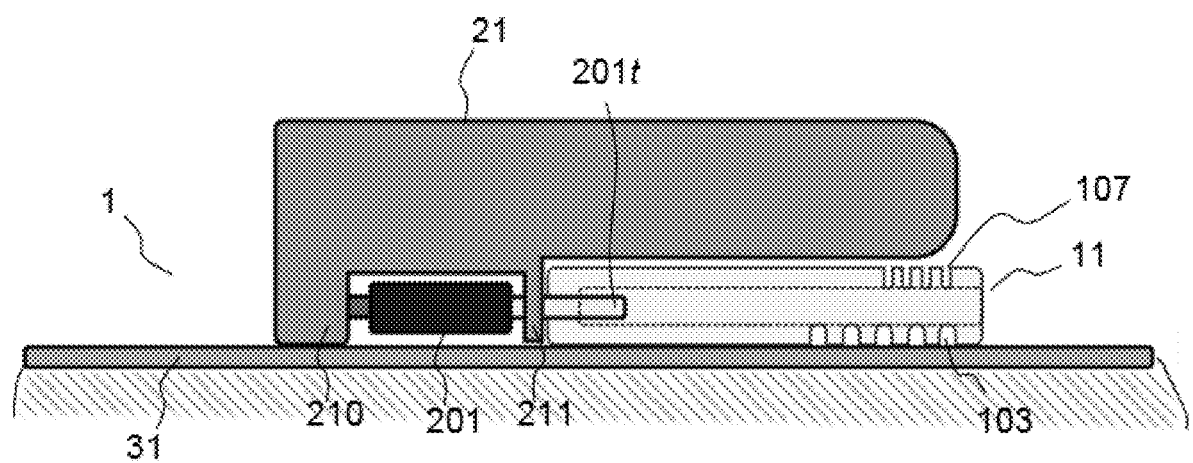
FIG. 1C is a corresponding side view, which further shows the microfluidic device capping the porous support according to at least one embodiment.

In all cases, an end $201t$, $202t$ of each of the electrodes 201, 202 can reach into the microchannel 104, upon insertion, as seen in FIGS. 1B and 1C. Since the ends of the electrodes are meant to allow electrochemical measurements, via these electrodes, one understands that these ends are ends of sensing portions (e.g., electrical conductor portions) of these electrodes.

The above configuration allows external electrodes 201, 202 to be easily plugged in (and, preferably, unplugged from) the microfluidic device 11-14. Pluggable electrodes are meant, as opposed to patterned (non-movable) electrodes. Because here the electrodes 201, 202 are inserted laterally, in-plane with the substrate 100, the electrodes 201, 202 extend in-plane with the substrate 100 after insertion. Since the substrate is likely laid flat and meant to be operated so, one understands that fragile electrodes 201, 202 are less likely to break upon and after insertion. In addition, in-plane electrodes are less dangerous, especially if the device is a wearable patch worn on or close to the skin, because electrodes 201, 202 extend parallel to the substrate 100 and hence parallel (rather than transverse) to the skin, in use. In addition, the present devices are preferably designed so as for electrodes to be easily replaced, e.g., in case they break or are not functional anymore, as exemplified latter.

The devices 11-14 can be regarded as microfluidic chips. The chips may for example be built on a wafer, such as, a silicon, glass or a metal wafer, depending on the application. Yet, other relevant substrates can be contemplated, such as thermoplastics (e.g., Poly (methyl methacrylate)), epoxy films, elastomers, epoxy-based printed circuit boards, or foils, for example. For biosensing applications as contemplated herein, it will typically be more practical to rely on polymer chips (plastics).

Different configurations may be contemplated. For example, one or more microchannels may be provided on the substrate and at least one conduit is provided for each channel (each of said conduits joins a lateral edge surface of the substrate to this channel). As another example, only one channel is assumed but at least two conduits 101, 102 are provided for the single channel. A number of other variants can be contemplated. For example, two channels may be provided, which are respectively joined by one and two vias. A conduit that is designed to receive an electrode (e.g., a reference electrode, a working electrode or an auxiliary electrode) may in fact cross two distinct channels or two channel portions that join at a junction, so as to average out signals measured via this electrode. In addition, multiplexing can be contemplated. For example, the device may have one reference electrode and multiple working electrodes with different surface coatings (chosen with respect to different analytes or electrolytes).

Preferably though, two conduits 101, 102, at least, are provided for one channel 104. Typically, such conduits are respectively designed to receive a reference electrode 101 and a working electrode 102. For example, the reference electrode 101 can be an Ag/AgCl reference electrode, whereas the active electrode 102 can be a specific metal, material, or alloy coated around a wire (e.g., TiN on wire).

In general, electrodes will have an elongated shape and their sensing part will typically have a level of symmetry, e.g., have cylindrical symmetry. For example, the sensing portion of a working electrode 102 can be in the shape of a needle, a hollow cylinder (to increase the sensing, surface area), or a rolled mesh or a porous electrode (to allow the liquid flow through the electrode). The sensing electrode 102 shall, in general, comprise a material that has a high conductivity (e.g., metals like Au, Pt, Pd, Ag, conductive inks, graphene or carbon electrodes). The sensing electrodes may involve various materials. For example: high conductivity (e.g., TiN) materials could be involved for pH sensing applications; Au can be used for biomolecule detection; and thiol chemistry (AgCl/Ag) can be relied on for chloride detection.

Various embodiments are described in the following, in reference to the accompanying drawings. As for instance seen in FIGS. 1A and 2A, the microchannel 104 shall preferably extend, at one end, from a sample collection aperture 103 (or loading pad). This aperture is formed on a main surface of the substrate 100 (typically on the same side as the groove 104). The aperture 103 is configured so as to collect a sample S transversely to the main surface (on which the aperture is provided) and then allow the collected sample S to pass into the microchannel 104, as illustrated in FIG. 1B.

The aperture 103 may for instance be formed as a recess or a large transversal via open on a main surface of the substrate 100. This recess and/or via may be open on either side or both sides of the substrate 100. In all cases, it allows the Sample S to be collected transversely to the substrate 100. In other words, the sample S can be transversely aspirated or otherwise passed along an out-of-plane direction, before being transported via the channel 104, i.e., in-plane with the substrate 100. As one may realize, this makes it possible for the device 11-14 to be embodied as an essentially flat (e.g., planar) device, which can easily be placed and worn by a user, which is particularly attractive for biosensing applications. In general, the sample S can be a liquid or vapor sample. Yet, it is typically a liquid, especially in biosensing applications.

In embodiments as depicted in FIGS. 1-4, the microchannel 104 extends (at another end) from an area 105, which area too is provided on a main surface of the substrate 100. Just like the aperture 103, the area 105 may be defined on either side of the substrate. The area 105 comprises a medium 106 configured so as to capillary pull a sample S from the microchannel 104. Note that the microchannel 104 is typically hydrophilic. In other words, at least one wall of this channel forms a hydrophilic flow path, along which an aqueous liquid can thus be pulled. Some of the walls, or edges, of the channel 104 may, however, be hydrophobic.

In variants, one may also consider a microfluidic sample collection device, including an actuation mechanism to pull or push the collected sample. For example, collected sample can be capillary pulled upon the user pressing the membrane (s) of a capillary valve. In variants, the sample could be pulled by vacuum suction, for example, using air aspirated along a closed channel 104, upon releasing pressure on opposite membranes of a deformable valve intercalated in the flow path, (e.g., in fluidic communication with the channel 104). In other variants, a direct mechanical actuation of the liquid can be contemplated, by pressing a membrane in contact with the liquid in the channel 104. So, instead of a continuous, capillary-pulled sample collection, variants involving an actuation mechanism can be contemplated, which enable a user-controlled sample collection. In still other variants, the microfluidic device may include electrodes extending across the channel and configured to generate an electroosmotic flow to pump the sample. In this case, a portion of the channel 104 may for example be filled with the sample by capillary action, while the additional electrodes are used to apply a potential difference and generate the electroosmotic flow.

In embodiments, the medium 106 comprises a liquid absorbent material and/or capillary structures. In each case, liquid comes to wet the microstructures of the absorbent material or the capillary structures, which, in turn, causes a capillary traction in the channel 104. Thus, the area 105 and the medium 106 together form a capillary pump. In variants, a large area 105 may be provided, at one end of the channel 104, so as to enable liquid evaporation and give rise to an evaporation-driven flow. If necessary, a heater may be provided (e.g., integrated in a peripheral device 21-23 that includes the electronics to interpret signals from the electrodes 201, 202), which can be placed in the vicinity of the area 105, to accelerate the evaporation. In addition, air vents 107 are preferably provided, to prevent compression of air during the filling of the channel with the liquid and to allow evaporation from an opposite surface of the device 11-14. The number of air vents and their sizes can be adjusted to optimize the evaporation-driven flow depending on the flow rate required by the application (i.e., less air vents to minimize the evaporation and vice versa). Incidentally, we note that the aperture 103 may also include an absorbent material, to initiate the liquid absorption. Vapor absorption can be contemplated too, as will be discussed below.

As for instance seen in FIGS. 1-4, the conduits 101, 102 of the present devices 11-14 extend from respective orifices 101o, 102o formed on a lateral surface of the substrate 100. These orifices 101o, 102o are preferably flared, so as to ease insertion of the electrodes 201, 202, in operation. Note that the devices 11-14 may be provided with electrodes already inserted therein, or not. When not already inserted, the user need to insert the electrodes themselves, in respective conduits 101, 102, so as for the electrodes 201, 202 to reach into the microchannel 104. Again, at least a portion of the electrodes is inserted (i.e., the sensing portion).

In embodiments, one or more of the electrodes 201, 202 have, each, an average diameter that is between 0.4 mm and 2.0 mm. For example, 0.5 mm leak-free reference electrodes 201, 202 are commercially available. Thinner electrodes 201, 202 may be designed in laboratories. Of course, larger electrodes 201, 202 (e.g., commercially available) are contemplated. However, due to fabrication constraints on the microfluidic device 11-14 and typical wafer sizes available or substrate thicknesses suitable for a wearable device, it may be best to have electrodes 201, 202 having diameters that are less than or equal to 2 mm, and even less than 1 mm. Such electrode sizes, however, make them more fragile, whence the advantage of electrodes being easily replaceable in the device.

The present devices 11-14 are preferably dimensioned as follows. The microchannel 104 has an average depth that is between 10 and 2,000 μm and an average width that is between 25 and 400 μm. The conduits 101, 102 are dimensioned according to the electrodes. Their average diameters (when laterally perforated) or their average depth (when grooved on the substrate) is thus preferably less than 2 mm (or even 1 mm). The lateral openings 101o, 102o, which are preferably flared, may have a slightly larger average diameter. The bottom apertures of the conduits, at the level of junctions with the channel 104, need be dimensioned consistently with both the electrodes' dimensions and the channel depth, so as to allow electrodes' tips to reach into the channel.

In embodiments, the electrodes 201, 202 are removably insertable in their respective conduits 101, 102. In other words, electrodes can be inserted and removed as needed. Thus, electrodes can easily be replaced, e.g., in case they break or are not functional anymore. To that aim, the electrodes 201, 202 and the conduits 101, 102 (and/or orifices 101o, 102o) need be complementarily shaped (or somehow configured).

Figure 3:
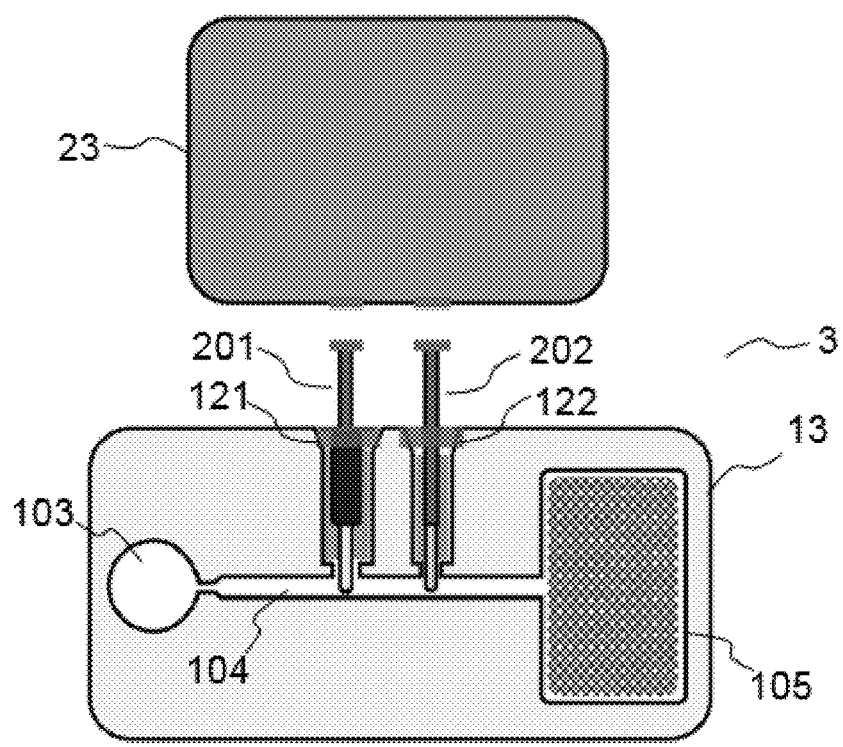
FIG. 3 is a bottom view of a microfluidic device and a housing, where electrodes are maintained on the microfluidic device according to a variant to FIG. 2.
Figure 4:
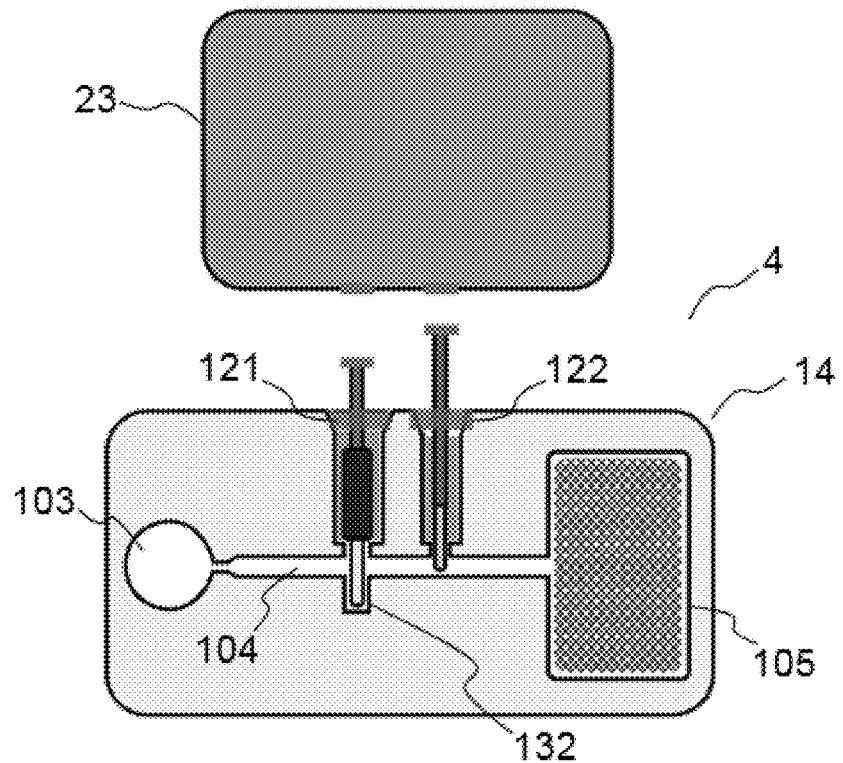
FIG. 4 illustrates a variant to FIG. 3, wherein an indent is provided to prevent evaporation of the electrode solution of a reference electrode, according to embodiments.

In addition, a fastening mechanism 121, 122, 210, 211 may be provided, as part of or within a peripheral device and/or the conduits, if needed. The fastening mechanism may for instance involve a snap-fit mechanism (e.g., involving metal snap fasteners, spring clips, or other snap-type connectors), a press-fit mechanism, gaskets, etc. For example, a snap-fit system 210, 211 may be provided on a peripheral device 21, as in FIG. 1C, to first attach electrodes to the peripheral device 21 and then introduce them in their respective conduits 101, 102 in the device 11. In variants, a press-fit mechanism 121, 122 is provided at the entrance of the conduits 101, 102 to initially insert electrodes 201, 202 therein, as depicted in FIGS. 3, 4. i.e., electrodes 201, 202 are fastened by forcing them into the orifices 101o, 102o of the conduits 101, 102 and are not necessarily removable in that case.

In general, the allowance of the conduits 101, 102, the orifices 101o, 102o, and/or the snap-fit or press-fit mechanism included may be refined to adapt the strength of fit, which may range from a loose fit, where electrodes 201, 202 are easily removable, to a tight interference fit, where electrodes are not removable or, at least, not easily removable (substantial force is needed to remove electrodes, which may possibly require a specific tool). The strength of fit need be refined based on the exact electrode types, their fragility, their costs, etc., as well as the application and the scenario chosen (i.e., whether components are re-usable or disposable). The lower the diameter of the sensing portions of the electrode (tips or needles), the higher the care needed when inserting electrodes 201, 202. Thus, the snap- or press-fit mechanisms may be designed in respect of (and so as to apply to) a sheath of the electrodes 201, 202 rather than their sole sensing portions, as assumed in FIGS. 3, 4. Yet, a snap-fit mechanism 210, 211 as shown in FIG. 1 may involve different components of the electrodes, e.g., the front tip (the sensing portion) and a backside of the electrodes, as assumed in FIG. 1 (see FIG. 1C). Many other types of interference fit mechanisms may be contemplated, which may be provided in/on the microfluidic device and/or in/on a peripheral device.

In embodiments, one or more of the conduits 101, 102 and/or the orifices 101o, 102o are configured so as for respective electrodes 201, 202 to be slidably inserted therein and form a slide link therewith. The electrodes concerned are not necessarily removable from the microfluidic device in that case, after insertion, although these electrodes are allowed to slide in the conduits. Thanks to the slide links, sliding electrodes 201, 202 may for instance be brought or pulled to their operation positions by the user. Slide links typically require additional mechanisms, such as inserted in the orifices (or deeper in the conduits). An example of slide link mechanism is assumed in FIG. 4, which is discussed later in detail.

In other variants as evoked above, electrodes are fixedly maintained after the initial insertion. Such an approach is an option for disposable microfluidic devices. To that aim, one may use a press-fit mechanism (to initially insert electrodes), which result in a tight fit. Preferably, a gasket 121, 122 is provided at the entrance of the conduits 101, 102 (at the level of orifices 101o, 102o) to maintain the electrodes once inserted. Although a gasket may already provide a sufficiently tight fit, a more complex press-fit mechanism may be relied on, for example, which may include such a gasket and/or specifically shaped conduits. Advantageously, gaskets may further prevent the liquid sample to leak and escape from the channel 104, even if electrodes 201, 202 are allowed to slide within their respective conduits.

If necessary, glue may be used to further fix the inserted electrodes in variants where electrodes 201, 202 are meant to be permanently (non-removably) inserted in their respective conduits. For example, although the conduits and electrodes may be configured so as to allow electrodes to be removed from and/or to slide in respective conduits, glue may be used to further fix the inserted electrodes, such that electrodes 201, 202 are permanently held on the device. Again, such a scenario can be contemplated for disposable microfluidic chips, for instance, whereas removable/replaceable electrodes would be advantageously used in re-usable chips.

For example, the manufacturer may use the present approach and techniques to achieve an easy integration of electrodes. Yet, assuming that both the electrodes and the microfluidic device can be disposed of, the manufacturer may choose to glue the electrodes permanently after their initial insertion. After use, the user may dispose of the microfluidic device, with the electrodes still inserted therein.

However, where reusable components are desired, the manufacturer may instead want to provide the microfluidic device, the electrodes and electronics separately. In that case, the user inserts the electrodes before using the microfluidic device, then removes the electrodes after use, and typically cleans the various components, stores them and reuses part or all of these components as needed. For example, some of the electrodes may be disposed of, if not re-usable, whereas the chip can be re-used. In this case, these electrodes need be non-permanently fixed to the microfluidic device, as assumed in FIGS. 1 and 2.

Intermediate scenarios can be contemplated, where some of the electrodes can be unplugged whereas others are fixedly maintained and not replaceable. Again, the precise design options depend on the application and scenario retained by the manufacturer.

Another challenge is to prevent liquid to escape the device 11-14, as needed in applications. At least, the liquid should preferably not leak through the conduits. However, liquid may for instance be evaporated once it has reached an appropriate place 105 therefor. To address this, the conduits 101, 102 may comprise, each, a hydrophobic inner coating 141 (see for instance FIGS. 2A and 2B), to prevent liquid to escape from the channel 104. In variants, or in addition to this hydrophobic coating 141, cylindrical inserts, gaskets, and/or any suitable liquid pinning structures may be used, in order to retain the collected sample S in the microfluidic channel 104.

The hydrophobic coating 141 could be a layer of material patterned or structured inside the conduits 101, 102. To that aim, a material layer 141 may be deposited (surface treatment) or a physical component (hydrophobic or watertight gasket) may be inserted inside the conduits. For example, the coating 141 may be deposited from a liquid solution or from a gas phase (e.g., a poly(p-xylylene) polymer may be deposited by chemical vapor deposition, as known per se).

Note that, in embodiments, the device may be provided with sufficiently hydrophilic channel walls for sample collection and flow generation. Thus, the collected sample may, when moving along the channel 104, try to escape from any opening that is wettable. There, the liquid may slowly travel over the electrodes and reach into electronics of a peripheral device 21-23, which could cause contamination problems and lead to erroneous results when reading signals obtained via the electrodes 201, 202. Thus, special care may be given to prevent leaks and one may accordingly want to heighten means to prevent such leaks. For example, and as assumed in FIGS. 2A and 2B, not only the conduits 101, 102 may comprise a hydrophobic inner coating 141, but, in addition, the junctions formed by the conduits 101, 102 with the channel 104 may comprise a liquid pinning angle, as discussed now in reference to FIG. 2A.

This liquid pinning structure may notably be formed by an opening angle $\theta_1$ (e.g., between 90° and 160°). For example, this angle may simply be of 90° (i.e., formed by a straight lower wall delimiting a bottom of the conduit and extending perpendicularly to the liquid inlet direction at the junction with the channel 104) as assumed in the accompanying drawings. In more sophisticated embodiments, this angle may be strictly larger than 90°, thus the angle may, for example, be of 135°. In all cases, considering a situation where liquid fills the junction with an advancing contact angle, the enlargement, i.e., the widening at the entrance in the conduit 101, 102 adds an angle component that challenges the propagation of the meniscus into the cavity. In variants, though, the opening angle may be less than 90° (e.g., between 60° and 90°) inasmuch as the inner walls of the conduits are already hydrophobic. Other designs of liquid pinning structures can be contemplated. Note that liquid pinning structures could be used alone or in addition to a hydrophobic treatment.

In that respect, a hydrophobic treatment can be applied to both the conduits and/or the electrodes. In other words, a hydrophobic coating can be deposited on the electrodes too (excepted on the sensing portion of the electrode that should remain in contact with the liquid), to further prevent the liquid to advance along the electrode, in operation.

In preferred embodiments as illustrated in the accompanying drawings, the microfluidic devices 11-14 comprise two conduits 101, 102 and two electrodes 201, 202 respectively inserted in the two conduits 101, 102, such that an end 201t, 202t of each of the two electrodes 201, 202 reaches into the microchannel 104. Now, the two conduits 101, 102 are preferably configured such that a distance between the ends of the two electrodes 201, 202 (the ends that reach into the channel 104) be less than 2 mm. This upper bound may markedly limit the resistance that arises due the solution probed in the channel 104 in practice (for aqueous/biological fluids). More preferably though, this distance shall be less than 1 mm, to further reduce this resistance.

Such considerations apply, in particular, to the spacing between a reference electrode and the sensing surface of a working electrode. Note, in that respect, that in typical embodiments as illustrated in the accompanying drawings the two electrodes 201, 202 include a reference electrode 201 and a working electrode 202. For example, the reference electrode may be an Ag/AgCl reference electrode and the active electrode may be a specific metal, material, or alloy coated around a wire (e.g., TiN on wire), as noted earlier.

Now, although two conduits 101, 102 and a single channel 104 are assumed in most examples described herein, the present microfluidic devices may also be embodied as devices involving more than one channel and more than two conduits. Namely, such devices may include one or more microchannels, each formed as a groove on a main surface of the substrate, as well as three or more conduits. Consistently with principles described earlier, each conduit may extend parallel to a main surface of the substrate, and from a lateral surface of the substrate up to a lateral wall of one of the microchannels. Additionally, each conduit is configured so as to allow insertion of a respective electrode therein. Thus, at least three electrodes are involved here, which may for instance include a reference electrode and at least two working electrodes. In each case, the sensing end of each of the electrodes reaches into one of the microchannels, after insertion.

Having several working electrodes insertable in the microfluidic device can be exploited for multiplexing purposes. For multiplexing applications, the device will typically include a reference electrode and multiple working electrodes, with different surface coatings (specific to different analytes or electrolytes). The collected sample may be transferred along a single channel (through which electrodes extend in parallel) or along separate channel portions, to which one or more electrodes are assigned.

In other variants, three or more electrodes are involved, which comprise a reference electrode, a working electrode and an auxiliary (counter) electrode, hence forming a three electrode system, for voltammetry experiments.

Next, referring to FIG. 4, the present devices may further comprise one or more indents 132, to seal electrode tips. For example, FIG. 4 depicts a microfluidic device 13, which has a channel 104 that includes an indent 132. The latter is arranged opposite to the conduit meant to receive the reference electrode in this example. Thus, a reference electrode can be inserted in this conduit, such that an end of this electrode reaches into the opposite indent 132 through the channel 104. Providing such an indent is advantageous where fragile electrode tips need be protected, when not in use. In addition, the reference electrode may be pushed so as for its tip to reach the bottom face of the indent 132 (assuming this electrode can slide in its conduit), in order to seal the diaphragm (e.g., a glass frit) at the apex of the electrode and prevent evaporation of an electrolyte in the electrode tip. Note, however, that leak-free reference electrodes exist, whose electrolyte is sealed inside the electrode tip.

When the device is not in use, the reference electrode can stay in the device, with its sensitive tip pushed into the indent 132. A user willing to use the device just needs to slightly pull the encased electrode to allow the collected sample to flow through this electrode. Such embodiments typically involve slide links as discussed earlier.

The present microfluidic devices can be provided as part of a set of components, including a microfluidic device and electrodes, with the latter already inserted in the device, or not. Now, and according to another aspect, the invention can be embodied as a set 1-4 of components that further include an electronic (peripheral) device 21-23, in addition to a microfluidic device 11-14 such as described above and electrodes 201, 202. Examples of such sets 1-4 are depicted in FIGS. 1-5. In each of these examples, the electronic devices 21-23 comprise a housing, in which electronics 24 is encapsulated. The housing and electronics 24 are designed in such a manner that the electronics can be set in electric communication with the electrodes. Furthermore, the electronics 24 are configured to read signals obtained from the electrodes 201, 202, in operation.

For the sake of depiction and conciseness, a simple circuit 24 is assumed in FIG. 1A, which in this case corresponds to a classic two-electrode setup. Of course, the embedded electronics may be more sophisticated. For example, the working electrode may be electrically connected to the base of a bipolar junction transistor housed in the electronic device 21-23. In addition, the electronics may possibly support wireless communication (e.g., Bluetooth® (Bluetooth and all Bluetooth-based trademarks and logos are trademarks or registered trademarks of Bluetooth SIG, Inc. and/or its affiliates)) and include sensors for temperature and humidity sensing. The electronics may further be electrically connectable to electrodes in the devices 11-14 and drive the electrodes to enable active manipulation of the liquid (electroosmotic flow, evaporation-driven flow using a microheater), as well as for reading signals therefrom. Temperature and humidity sensors may be configured such as to allow the temperature and humidity to be sensed for each of the surface (e.g., human skin) on which the experiment is performed and the environment. Sensing environmental parameters may be needed for calibration purposes and/or for suitably controlling the evaporation-driven flow). In addition, a pressure sensor may be included, e.g., for calibration purposes.

The housing of the electronic devices 21-23 is preferably watertight. This way, liquid sample, such as sweat, is less likely to leak into the inner electronics 24 and the device can more easily be washed and cleaned after use. Incidentally, the device 21-23 may form part of a washable cloth, a headband, a belt, etc.

Figure 5:
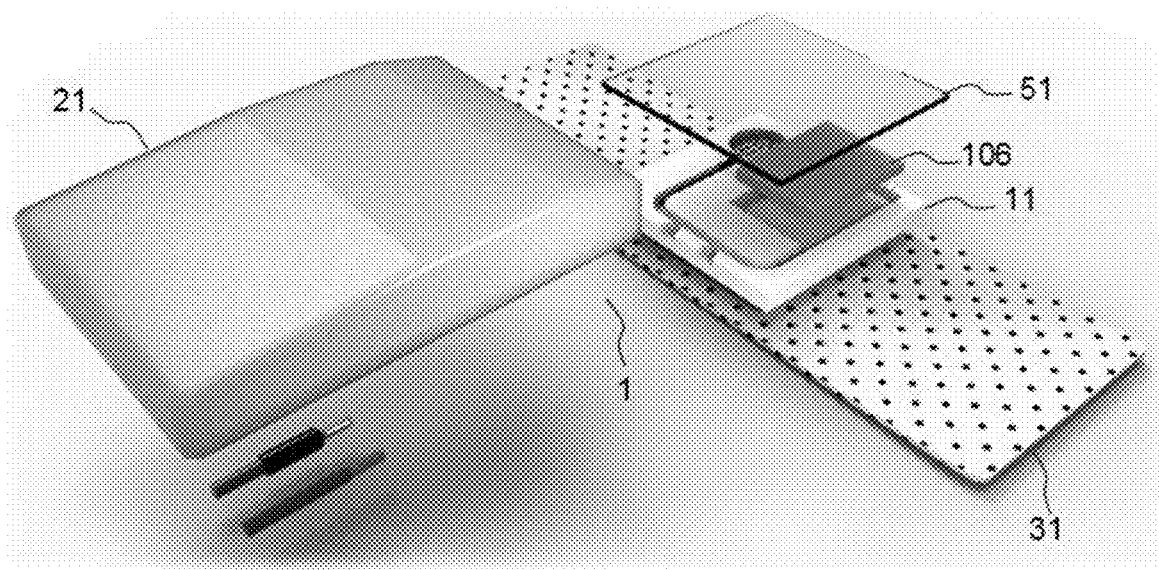
FIG. 5 is an exploded view of a set of components similar to that of FIG. 1.
Figure 6:
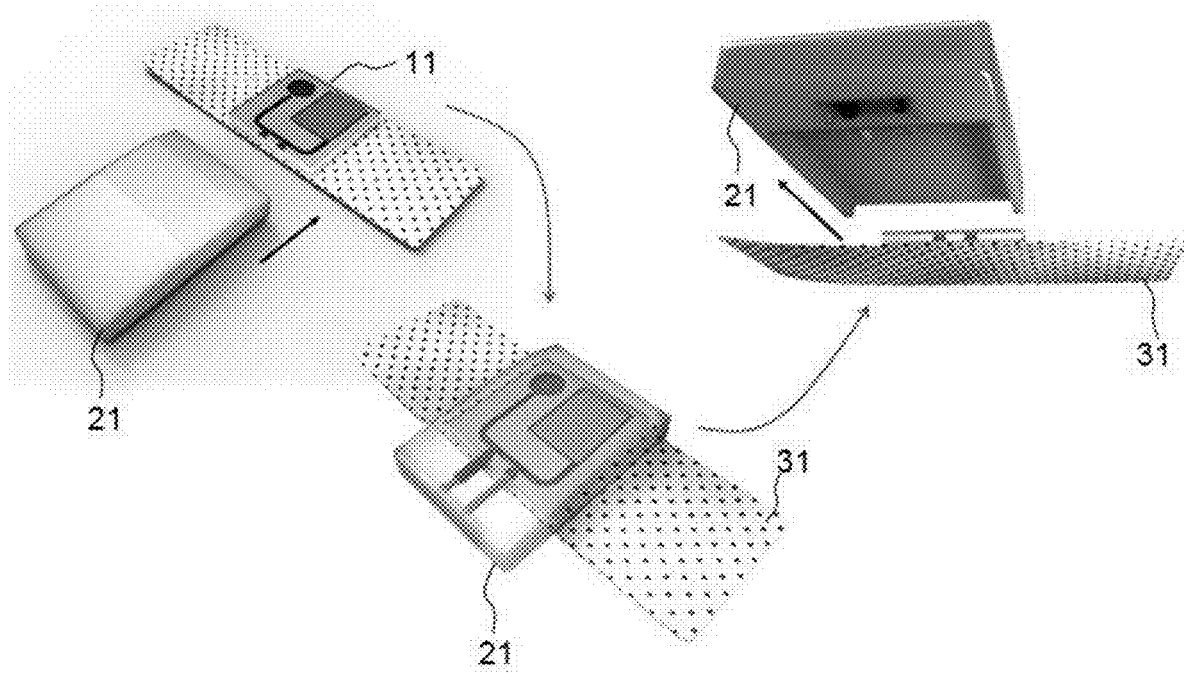
FIG. 6 shows 3D views of these components, in operation, and according to embodiments of a method according to the invention.

In embodiments such as depicted in FIGS. 1, 2, 5 and 6, the electrodes 201, 202 are or can be mounted on the housing of the electronic device 21, 22. For example, the electrodes may protrude from a lateral surface of the housing, as in FIG. 2, which allows a simple design and insertion of electrodes. However, electrodes are more likely to break in this configuration, owing to the moment of force exerted by the device 12 on the electrodes' bases. Therefore, in more sophisticated embodiments, such as depicted in FIGS. 1, 5 and 6, the electrodes extend parallel to the housing.

To that aim, the housing of the electronic device 21-23 may for example comprise a snap-fit mechanism 210, 211 to receive the electrodes, as evoked earlier and now described in detail. Thanks to this mechanism, the electrodes 201, 202 may for instance be removably received (inserted) in and between lugs 210, 211, that protrude transversely from the lower basis surface of the peripheral device 21. The lugs 210, 211 may notably comprise depressions, slots or holes to that aim. In particular, the front lug 211 may include holes or slots to allow insertion of electrode pins therethrough, whereby the sensing portion of the electrodes protrudes from the lug 211, such that it can still be inserted in a respective conduit of the device 11 and reach into the channel 104. Other types of supports (magnetic snaps, mechanical clips, etc.) may be contemplated, to removably (or permanently) receive the electrodes, as said. Once received in the mechanism 210, 211, electrodes 201, 202 extend parallel to the lower basis surface of the housing of the device 21. The electrodes can then be inserted in the conduits 101, 102 of the microfluidic device 11, by suitably pushing the housing of the peripheral device 21, above and parallel to the device 11. In the example of FIG. 1, the peripheral device 21 comes to cap the device 11, thanks to the complementary shapes of the two components 11, 21. Assuming further the housing of the peripheral device 21 has a form factor (as in FIG. 1, 5 or 6), the assembled components make up a shallow assembly, having improved ergonomics compared with designs where electrodes protrude from a lateral surface of the housing (as in FIG. 2). All the more, electrodes are less prone to breakage with the configuration of FIG. 1.

In still other embodiments, electrodes are connected to the peripheral device interchangeably via a socket or screw mechanism so that damaged or improperly used electrodes can be replaced easily without replacing the whole peripheral device. Still, electrodes may be permanently connected to the electronic device (e.g., using a solder or conductive glue).

In embodiments such as illustrated in FIGS. 1C, 2B, 5 and 6, the sets 1, 2 further comprise a porous support 31, 32. The latter is dimensioned according to the microfluidic device 11, 12, so as for the substrate 100 of the device 11, 12 to fit on this porous support 31, 32, in operation. In other words, the porous support is typically as wide as or wider than a lateral side of the substrate 100, for the substrate to fit thereon. As mentioned earlier, the microchannel 104 extends from a sample collection aperture 103 (formed on a main surface of the substrate 100).

In the context of FIGS. 1, 2, 5 and 6, the microfluidic chip 11, 12 is meant to be applied to the porous support (e.g., sweat porous adhesive) 31, 32, which is itself applied onto the skin of user, who is subject to perspiration. In this context, the aperture 103 allows a liquid sample S (sweat) to be collected from the skin, via the porous support 31, 32 and passed into the channel 104. In the more specific context of FIGS. 1, 5 and 6, the electronic device 21, 22 is further meant to cap the microfluidic chip 11, instead of being applied, parallel thereto, onto the porous support 32, as in the context of FIG. 2 (see, e.g., FIGS. 2B and 2D). The operation principle is otherwise similar. As further seen in FIG. 6, the electrodes can be unplugged from the device 11 after use, by retracting the peripheral device 21 from the microfluidic device 11.

In specific embodiments, the porous support may be a vapor permeable adhesive patch, including a porous backing. The patch may possibly include a formulation on one side of or in the backing. If only vapor is absorbed, then a liquid medium need be provided in an absorbent and/or in the channel 104 of the microfluidic device to allow liquid circulation.

Yet, in other embodiments, the porous supports 31, 32 shall typically be meant and designed to absorb liquid (e.g., sweat), so as for this liquid to be transversely introduced in the substrate 100 (via the aperture 103) and then capillary pulled in the microchannel 104, for subsequent analysis, thanks to electrodes 201, 202.

In general, the porous supports 31, 32 may be implemented as or in a patch (e.g., provided with an adhesive so that it can be attached to the skin), a diaper and a mouthguard (e.g., a gumguard). Applications may notably be found for sweat analysis (e.g., via patches), urine collection/analysis (e.g., via diapers), or saliva collection/analysis (e.g., via mouthguards). Such analyses may, in particular, be advantageous for analyzing performances of athletes.

While examples discussed herein mostly address wearables and sweat collection/analysis systems, we note that the present approach may also be used in in-vitro diagnostics platforms. For example, a user could pipette the sample (e.g., blood, human serum, urine, saliva, tap water, other water resources) to the sample collection aperture (loading pad) 103 and then take steps to analyze the collected sample for specific analytes, via electrodes of the microfluidic device. In addition, the peripheral electronic devices 21-23 may be part of a consumer good (such as a clothing hat, band, diaper or wearable watch, etc.), to which the microfluidic part can be attached. This consumer good may further be designed to remain in contact with the skin (e.g., it may comprise adhesives, rubbers or otherwise be stretchable).

Figure 1D:
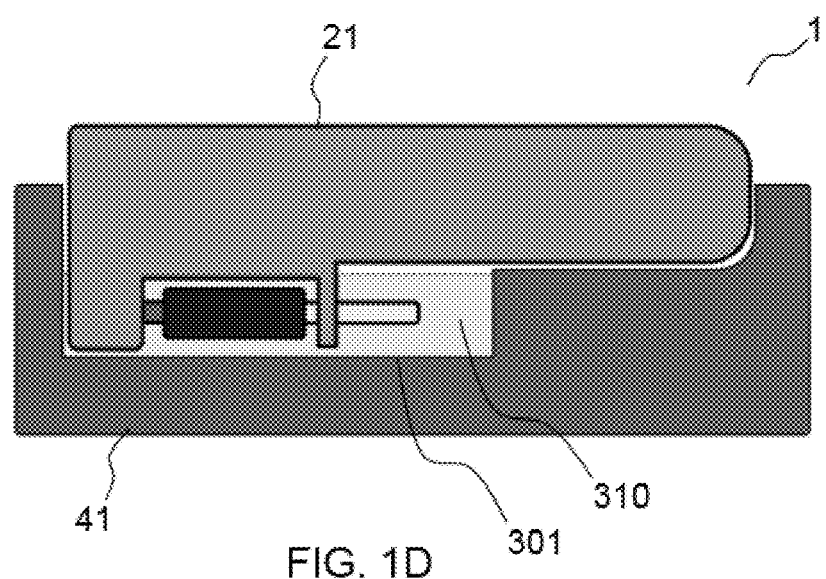
FIG. 1D is a side view of the housing stored on a storage cap when not in use according to at least one embodiment.

For completeness, a set 1, 2 according to embodiments may further comprise a storage cap 41, 42 for storing the electronic device 21, 22, when not in use (see FIGS. 1D and 2E). The storage cap 41, 42 comprises cavities 301 designed to receive electrodes 201, 202 (mounted on the device 21, 22) while the device 21, 22 is stored on the storage cap 41, 42. The cavities 301 may for instance be designed jointly with the electrodes 201, 202, such that the latter do not contact any surface of the cavities 301, when stored on the storage cap 41, 42. In variants, the cavity 301 receiving the reference electrode may be designed so as to seal the apex of this electrode, for reasons mentioned earlier. A storage solution 310 may for instance be poured in the cavities 301 (e.g., deionized water), to preserve electrodes 201, 202, if needed. In addition, the cavities 301 may possibly be designed (e.g., include liquid pinning features) to prevent or delay evaporation of this storage solution 310 from the cavities 301.

At present, referring to FIGS. 1A-1C, 2C-2D and 6, a final aspect of the invention is now briefly described, which concerns methods of operating a microfluidic device 11-14 such as described herein. Aspects of these methods have already been implicitly described in reference to the present devices 11-14 and sets 1-4 of components; they are only briefly summarized in the following.

As already explained, the present methods revolve around inserting one or more electrodes 201, 202 in one or more (respective) conduits 101, 102 of the substrate 100 of a microfluidic device 11-14. This is done so as for the end 201$t$, 202$t$ (i.e., the tip or pin end) of each of the electrodes 201, 202 to reach into the microchannel 104 of the device 11-14.

This way, signals can subsequently be read via the electrodes 201, 202. The signals convey information about a sample S collected in the channel 104 of the device 11-14. This, in turn, allows the sample S to be analyzed, e.g., most practically via an electronic device 21-23 paired to the device 11-14, as described earlier in reference to FIGS. 1-4. To that aim, a liquid comprising the collected sample S may be capillary pulled in the microchannel 104, which makes it particularly simple and cost-effective as little additional structures are needed to capillary pull the liquid.

In applications to, e.g., wearables and body fluid analyses, the device 11-14 is maintained (with the electrodes 201, 202 inserted therein) on a surface (e.g., the skin) that produces the liquid collected for analysis, while capillary pulling the liquid. As noted earlier, this may involve a porous support 31, 32 sandwiched between the liquid-producing surface and the microfluidic device 11.

The above embodiments have been succinctly described in reference to the accompanying drawings and may accommodate a number of variants. Several combinations of the above features may be contemplated. Examples are given in the next section.

2. Specific Embodiments—Technical Implementation Details 2.1 Examples of Configurations 2.1.1 Wearable Microfluidic Patch with Lugs for Parallel Electrode Insertion, FIGS. 1A-1D FIGS. 1A-1D depict an electronic peripheral device 21 having embedded electronics 24, and which can be mounted on a microfluidic patch 11. Electrodes 201, 202 are (removably) received in a snap-fit mechanism, which contains lugs 210, 211 structured with openings to place and fix electrodes 201, 202. Once placed in the structured lugs, the electrodes extend parallel to a lower basis surface of the housing. If necessary, electrodes can be unplugged and easily be replaced, as explained earlier in sect. 1. The patch 11 has conduits 101, 102 coated with a hydrophobic coating, to prevent liquid S to escape the channel 104 and leak through the conduits 101, 102, in operation. In addition, liquid pinning features may be provided at the junctions formed between the conduits 101, 102 and the channel 104. For completeness, the electrodes 201, 202 too may be coated with a hydrophobic material. The conduits 101, 102 have flared openings 101o, 102o to ease electrode insertion. An absorbent material 106 is placed in an area 105 linked to the aperture 103 (from where the sample is collected in operation) via channel 104, to act as a capillary pump. The aperture 103 is structured, as shown in FIG. 1C to maximize the efficiency of sample collection. Air vents 107 are placed at the end of the flow path, opposite to area 105. Such air vents may for instance have openings orthogonal to the average plane of the microfluidic device, as in FIG. 1C, or in-plane with the microfluidic channel 104. The sample S is collected from the aperture 103 via a porous material 31, the latter applied on a given surface (e.g., a human skin, to collect sweat). Signals read via the electrodes 201, 202 can then be analyzed, thanks to electronics 24 embedded in the housing of the device 21. The peripheral device 21 is stored on a storage cap 41 when not in use.

2.1.2 Peripheral Device with Lateral Electrodes, Alternate Design of Microfluidic Device, FIGS. 2A-2E

Figure 2A:
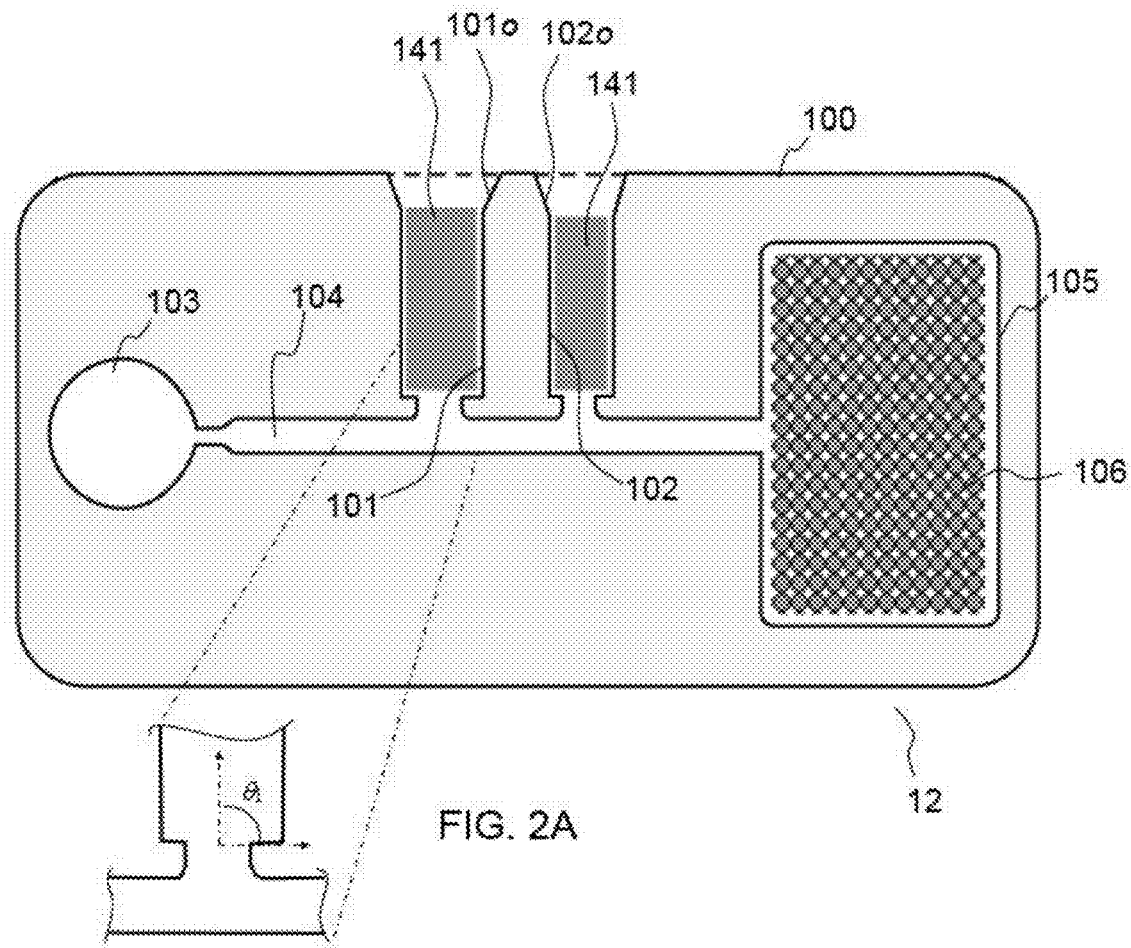
FIG. 2A shows a bottom view of the microfluidic device and the housing, before assembly according to at least one embodiment.
Figure 2B:
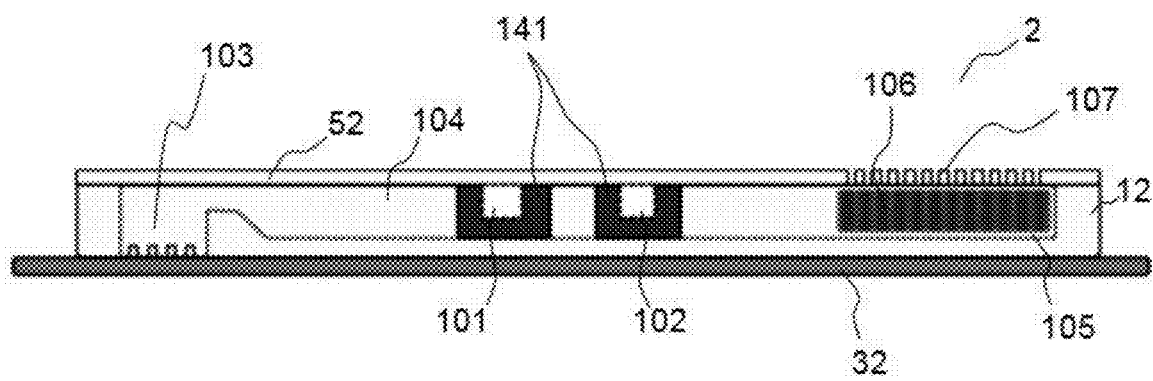
FIG. 2B is a corresponding longitudinal section view, which further shows the microfluidic device capping the porous support according to at least one embodiment.

FIGS. 2A-2E depict a similar set of components as FIGS. 1A-1D and shows additional details of a chip 12, according to embodiments. The electronic peripheral device 22 is similar to the device 21, except that electrodes 201, 202 are now laterally protruding from the device 22. The microfluidic device 12 is similar to the device 11 except the aperture 103 and the capillary pump 106 are located on opposite sides of the chip, and can therefore be connected via a straight microfluidic channel. As seen in FIGS. 2A-2B, a lateral and/or a vertical constriction may be defined between aperture 103 and the channel 104 to create a capillary retention valve. In case the sample flow is not continuous (e.g., discontinuous sweat generation), this passive valve, which enables a higher capillary pressure than the capillary pump, guarantees that the liquid front at the inlet side always stays at the aperture 103 so that newly generated sweat merges with sweat already in the channel without creating an air bubble.

Electrodes 201, 202 may possibly be (removably) received in a snap-fit mechanism provided on the peripheral device (not shown). However, positioned on the peripheral device 22, the electrodes now extend perpendicular to a lateral surface of the housing. Electrodes may possibly be replaced. Electrodes are again inserted laterally in conduits 101, 102 of the device 12, by pushing the peripheral device 22 against the microfluidic device 12. Again, the peripheral device 22 is stored on a storage cap 42 when not in use.

2.1.3 Electrodes Located on the Disposable Microfluidic Patch, FIGS. 3, 4

FIGS. 3 and 4 illustrate other designs of component sets 3, 4 in which electrodes are now located on the disposable microfluidic device 13, 14. Interference fit mechanisms 121, 122 are used to insert electrodes 201, 202, which are fixedly mounted in their respective conduits 101, 102. An exception concerns the reference electrode of FIG. 4, which is slidably received in its respective conduit. This way, the tip of the reference electrode can be pushed in or retracted from the opposite indent 132, as explained in the previous section.

Note that in all cases (FIGS. 1-4), the electrodes can be brought in electrical communication with electronics 24 embedded in the peripheral devices 21-23, so as to be able to analyze signals received via these electrodes and perform electrochemical measurements.

2.2 Specific Embodiments

As an example of a specific embodiment, a reference electrode 201 is used together with a working electrode 202, wherein the working electrode is electrically connected to the base of bipolar junction transistor (BJT). The sensing portion of the working electrode 202 is for instance shaped as a needle, a hollow cylinder (to increase the sensing surface area), or a rolled mesh. The spacing between the reference electrode and the sensing portion of the working electrode is less than 1 mm, in order to substantially reduce resistance that arises due to the tested solution. During the sensing operations, the working electrode is connected to the base of the BJT, the reference electrode is held at 0 V, the collector is held at a 0 V and a fixed negative voltage is applied at the emitter, resulting in a positive base-emitter voltage ($V_{BE}>0$), assuming an NPN BJT. The sensing signal is the collector current (called $I_C$). For a fixed $V_{BE}$ potential, $I_C$ sensing current changes depending on the pH (e.g., TiN electrodes) or the concentration of an analyte (e.g., functionalized Au electrodes).

The type of storage solution chosen depends on the electrode materials. Yet, the sensing electrode surface does not always need be stored in solution. For example, an AgCl/Ag reference electrode need typically be stored in deionized water to reduce the setting time. The active electrode (e.g., comprising TiN) may be either stored in dry or in a solution. Still, functionalized sensing electrodes may be involved, for example, for detection of DNA or some proteins (e.g., streptavidin). Such functionalized electrodes need typically be stored in dry as storage in solution typically causes desorption of the functionalized layer over time, thus reducing the shelf lifetime.

In variants, the sensing electrode can be electrically connected to the gate electrode of a field effect transistor device (FET), in which case the applied voltages differ during the sensing operations. Namely, the reference electrode is now held a positive voltage (which should normally be lower than the threshold voltage of the device (assuming an nFET device). The source and substrate voltages are held at zero and the drain voltage is held at fixed, small positive voltages (typically less than 0.1V). The sensing signal is the drain current (Id). The analyte concentration can be inferred from changes in the measured values of the drain current.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A microfluidic device, comprising:
   a substrate with a microchannel formed as a groove on a main surface of the substrate, wherein the microchannel has a fluid flow path within the microchannel;
   two conduits extending parallel to said main surface, from a lateral surface of the substrate up to a lateral wall of the microchannel, the two conduits configured so as to allow insertion of two electrodes therein, respectively, and such that an end of each of the two electrodes reach into the microchannel, wherein the two electrodes reaches in to the fluid flow path within the microchannel; and
   an indent, arranged opposite to a first conduit of the two conduits, respectively, such that a first electrode of the two electrodes reaches across the fluid flow path within the microchannel and that the end of the first electrode extends into the indent, wherein the indent protects the end of the first electrode, wherein the end of a second electrode remains within the fluid flow path.

2. The microfluidic device according to claim 1, wherein the microchannel extends, at one end, from a sample collection aperture formed on a main surface of the substrate, the aperture configured so as to collect a sample transversely to the main surface and allow collected sample to pass into the microchannel.

3. The microfluidic device according to claim 2, wherein the microchannel extends, at another end, from an area on a main surface of the substrate, wherein the area comprises a medium configured so as to capillary pull sample from the microchannel.

4. The microfluidic device according to claim 3, wherein said medium comprises a liquid absorbent material and/or capillary structures, so as for the area and the medium to form a capillary pump.

5. The microfluidic device according to claim 1, wherein said two conduits extend from two orifices, respectively, the two orifices formed on said lateral surface of the substrate; and wherein the two orifices are flared, so as to ease insertion of said two electrodes, in operation.

6. The microfluidic device according to claim 1, wherein each of the two electrodes has an average diameter that is between 0.4 mm and 2.0 mm.

7. The microfluidic device according to claim 1, wherein, the two conduits are configured so that the first electrode and the second electrode to be removably inserted in the two conduits, respectively.

8. The microfluidic device according to claim 1, wherein the two conduits are configured so that the first electrode and the second electrode to be slidably inserted in the two conduits.

9. The microfluidic device according to claim 1, wherein each of the two conduits comprises a hydrophobic inner coating and/or a liquid pinning structure.

10. The microfluidic device according to claim 1, wherein the two conduits are configured such that a distance between the ends of the two electrodes that reach into the microchannel is less than 2 mm.

11. The microfluidic device according to claim 1, wherein the two electrodes include a reference electrode and a working electrode.

12. The microfluidic device according to claim 1, further comprising:
    one or more microchannels, each formed as a groove on a main surface of the substrate; and
    at least three conduits extending parallel to said main surface, from a lateral surface of the substrate up to a lateral wall of one of the one or more microchannels, the at least three conduits configured so as to allow insertion of at least three electrodes therein, respectively, these electrodes including a reference electrode and at least two working electrodes, and such that an end of each of the at least three electrodes reach into one of the one or more microchannels.

13. A microfluidic device, comprising:
    a substrate with a microchannel formed as a groove on a main surface of the substrate, wherein the microchannel has a fluid flow path within the microchannel;
    two conduits extending parallel to said main surface, from a lateral surface of the substrate up to a lateral wall of the microchannel, the two conduits configured so as to allow insertion of two electrodes therein, respectively, and such that the two electrodes each having an end that reaches into the microchannel, wherein the end of the two electrodes reaches in to the fluid flow path within the microchannel;
    an indent, arranged opposite to a first conduit of the two conduits, respectively, such that a first electrode of two electrodes reaches across the fluid flow path within the microchannel and that the end of the first electrode extends into the indent, wherein the indent protects the end of the first electrode, wherein an end of a second electrode remains within the fluid flow path;
    the two electrodes; and
    an electronic device comprising:
       a housing; and
       electronics encapsulated in the housing, such that the electronics are set in electric communication with said one or more electrodes, the electronics being otherwise configured to read signals obtained from the first electrode and the second electrode, in operation.

14. The microfluidic device according to claim 13, wherein
    said housing is watertight.

15. The microfluidic device according to claim 13, wherein
    the two electrodes are mounted on the housing and are, each, protruding from a lateral surface of the housing.

16. The microfluidic device according to claim 13, wherein
    the housing of the electronic device comprises a snap-fit mechanism configured to receive said two electrodes, so as for these electrodes to extend parallel to a basis surface of the housing, when received in the snap-fit mechanism.

17. The microfluidic device according to claim 13, further comprising:
    a porous support, the substrate of the microfluidic device adapted to fit on this porous support, and wherein the microchannel of the microfluidic device extends, at one end, from a sample collection aperture formed on a main surface of the substrate, the aperture configured so as to collect a sample from the porous support and allow collected sample to pass into the microchannel, in operation.

18. The microfluidic device according to claim 13, further comprising:
    a storage cap for storing said electronic device, the storage cap comprising one or more cavities designed to receive the one or more electrodes while the electronic device is stored on the storage cap, in operation.

\* \* \* \* \*